W. KAYLOR.
STOCK CAR.
APPLICATION FILED AUG. 26, 1912. RENEWED DEC. 26, 1913.
1,087,779.
Patented Feb. 17, 1914.
2 SHEETS—SHEET 1.
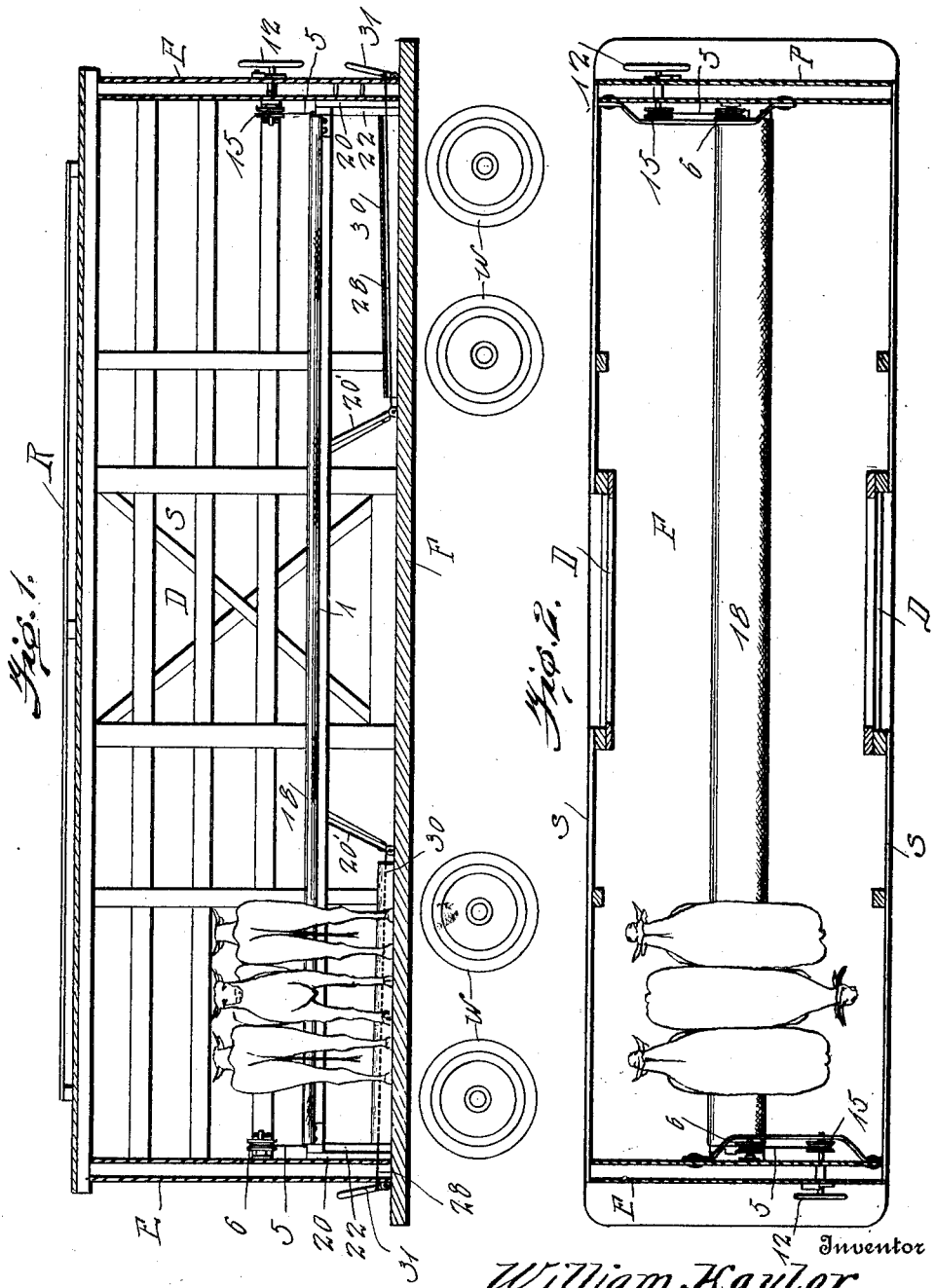

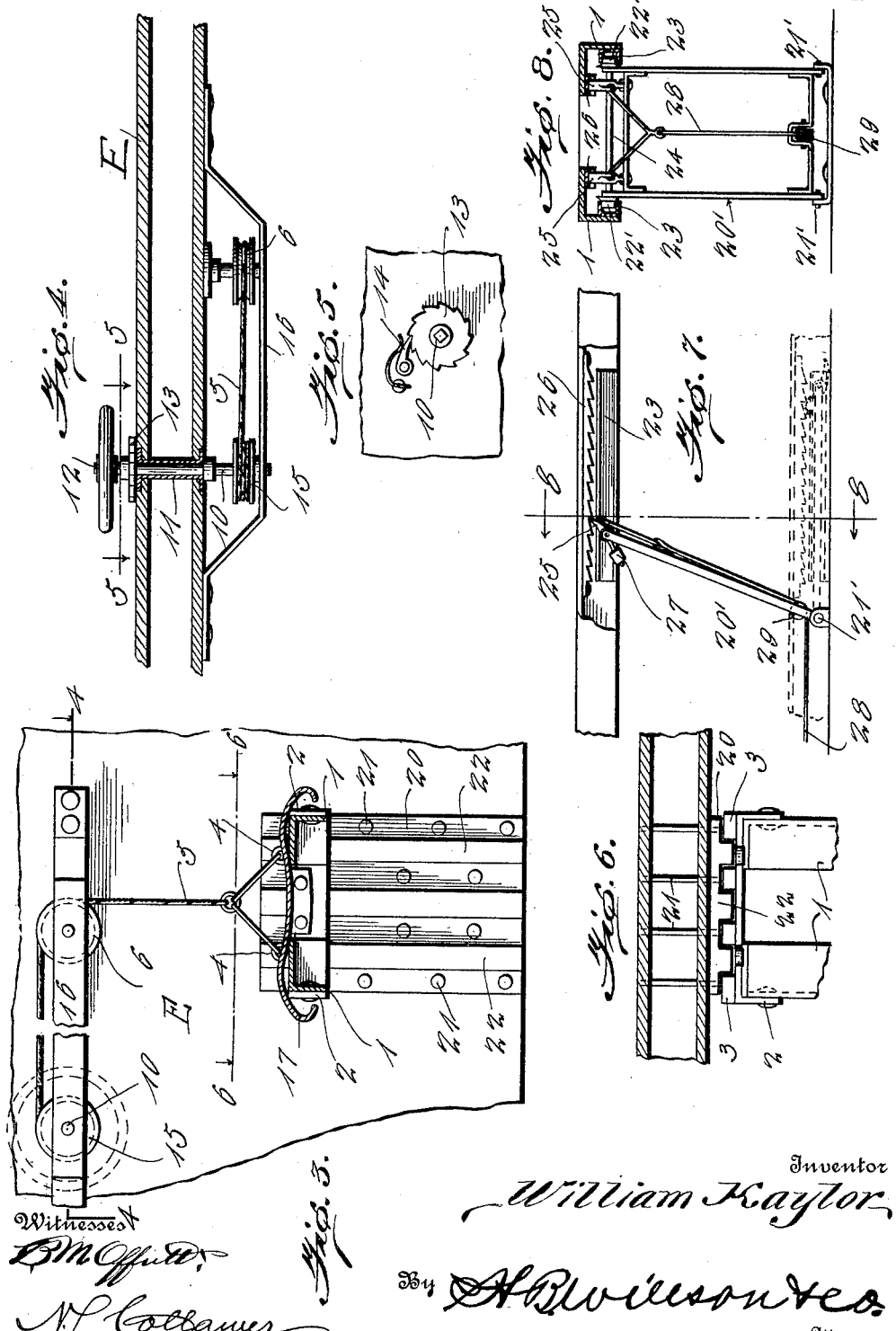

UNITED STATES PATENT OFFICE.

WILLIAM KAYLOR, OF MUSKOGEE, OKLAHOMA, ASSIGNOR OF ONE-THIRD TO JOHN M. KYKER AND ONE-THIRD TO RUTH L. WOODCOCK, BOTH OF MUSKOGEE, OKLAHOMA.

STOCK-CAR.

1,087,779.  Specification of Letters Patent.  Patented Feb. 17, 1914.

Application filed August 26, 1912, Serial No. 717,177. Renewed December 26, 1913. Serial No. 808,868.

*To all whom it may concern:*

Be it known that I, WILLIAM KAYLOR, a citizen of the United States, residing at Muskogee, in the county of Muskogee and State of Oklahoma, have invented certain new and useful Improvements in Stock-Cars; and I do declare the following to be a full, clear, and exact description of the invention, such as will enable others skilled in the art to which it appertains to make and use the same.

This invention relates to animal husbandry, and more especially to stock cars; and the object of the same is to provide a car of this character with a support extending longitudinally thereof and passing under the bellies of the animals, with means for adjusting its height and holding it when raised so as to cause them to maintain an upright position, prevent overcrowding, and prevent goring or other interference between them. This object is accomplished by the construction hereinafter more fully described and claimed, and as shown in the drawings wherein—

Figure 1 is a central longitudinal sectional view through a car equipped with this device, and Fig. 2 is a horizontal sectional view of the same. Fig. 3 is an enlarged elevation, taken from within the car and showing one of the guides for the end of the support, the latter being shown in section; and Fig. 4 is a horizontal section through the end of the car and a plan view of the windlass. Fig. 5 is a sectional detail on the line 5—5 of Fig. 4. Fig. 6 is a section on about the line 6—6 of Fig. 3, omitting the support cover and the rope. Fig. 7 is an enlarged detail of one of the standards, and a side elevation of the support, partly broken away to show the connection of the upper end of standard therewith; and Fig. 8 is cross section on the line 8—8 of Fig. 7.

In the drawings is diagrammatically shown a stock car mounted on wheels W and comprising a floor F, ends E, sides S having doorways D, and a roof R; although it is to be understood that any suitable form of stock car might be employed, and in fact my device is an attachment which could be placed in a stock car already built. It is well known that in transporting animals in cars of this kind, much room can be saved therein if they may be required to remain standing, head to tail as shown in the drawings, and also while in this position they are prevented from bunching, crowding into any certain part of the car, lying down, goring or otherwise injuring each other, and generally behaving themselves in such manner that the weaker animals suffer by the acts of the stronger. On long journeys provision must of course be made for the comfort of the stock, but on short hauls the animals may be kept in an upright position without danger of injury to them from this fact and certainly with less danger of injury to them from maltreatment by other animals, and if they are packed into the car head to tail in the manner shown in Fig. 1 they can be fed through the open sides S from time to time if the length of the haul be sufficient to require attention of this kind. Various efforts have been made to bring about this end, principally by erecting stanchions or what might be called partitions across the car and alongside and between the animals, but the idea in the present invention is to provide a support disposed longitudinally throughout the length of the car and under the bellies of the stock, with means for raising it into contact with them and holding it rigidly there at such point that they cannot step over it, if packed into the car as shown they cannot turn around, they cannot lie down, and even a weak or sickly animal is provided for by the presence of such a support in that it may rest its weight thereon until the point of destination is reached.

Coming now more particularly to the details of this invention, the support shown in the drawings consists of a pair of parallel angle irons 1 which will be suitably connected throughout their length by means not necessary to show, but must be connected at their extremities by cross bars or brackets 2 whose outer faces carry lugs 3 for a purpose yet to appear and whose bodies may carry eyes 4 from which rises a rope at each end of the support, the rope 5 passing over an idle wheel 6 and led thence to a windlass. The latter may be of any specific construction, but is typically shown in Fig. 4 as consisting of a shaft 10 journaled in suitable bearings 11 through the end E of the car, and having a hand-wheel 12 at its outer end, behind which is a ratchet wheel 13 engaged by a pawl 14, also preferably on the outer end of the car where the operator can reach it; and on the inner end of the shaft 10 is a drum or pulley 15 in line with the idle wheel 6 so that the rope 5 may wind thereon as the wheel 12 is turned in the proper direction. The drum of the windlass and the idle wheel may be covered by a guard 16, preferably a piece of strap metal bolted to the end E of the car and bowed outward into the same so that the animals may not become entangled with the rope or other elevating mechanism. I wish it to be understood, however, that any other form of such mechanism and of its windlass may be employed without departing from the spirit of the invention. If angle irons 1 are employed for the support, they are preferably covered by a guard 17 which may be a metal strip having its edges turned under as shown in Fig. 3, and this guard will by preference be padded as indicated at 18 so that it will be soft where it contacts with the animals. It will be clear that when the hand-wheels 12 are turned in the proper direction to wind up the ropes 5 on the drums 15, the extremities of this support will be raised and throughout its length it will be caused to bear upward under the bellies of the animals standing within the car, as well shown in Figs. 1 and 2; and the result will be that if the animals are properly disposed in the first place and are packed into position in sufficient numbers to practically fill the car, as long as the support is maintained in this position, the objects aimed at in this invention will be accomplished without injury to the stock from themselves or from the apparatus.

For preventing the longitudinal or lateral dislodgement or disarrangement of the support by the struggling of the animals, their weight on the support, or the shifting of the load within the car which is due to the passing of the train around curves and to its stopping and starting, I preferably employ an upright guide at each end of the car best seen in Figs. 3 and 6. This consists of a plate 20 bolted to the car end E as at 21 and having a number of upright ribs 22 on its inner face and properly spaced to form guides for the lugs 3 on the brackets 2; and by preference I would extend the guide upward about half the height of the car, or perhaps less, so that when this attachment is not to be employed it can be lifted so high that the lugs will pass out of the grooves between the ribs 22 and the entire support can be taken out of the car. Obviously the use of this guide in conjunction with the lugs 3 or similar projections at the extremities of the support, will prevent the latter from lateral movement within the car, as well as from longitudinal movement therein; and the support cannot rise so long as there are many animals standing over it, and it cannot descend as long as the windlasses remain in good order.

Another feature which must be considered is that, in a car of the usual length now employed upon most railroads, a support constructed as shown would doubtless have to be extremely heavy in order to prevent it sagging between its ends. In order to overcome this defect or condition, I provide a plurality of standards whose details of construction are best seen in Figs. 7 and 8. That is to say, the numeral 20′ designates a skeleton framework hingedly connected as at 21′ with the car floor F in any suitable manner so that it may lie flat on the same when not in use, and the numeral 22′ designates rollers carried by the upper corners of this framework and traveling in channeled guides 23 forming part of or attached to the support as seen in Fig. 8. On a cross rod 24, at the upper end of this framework are mounted two pawls 25 whose tips are borne upward into normal engagement with rack bars 26 on the under side of the angle irons 1 by means of weights 27 at their rear ends as seen in Fig. 7; and said tips may be drawn downward out of engagement with said rack bars by means of a trip rope 28 whch leads from the pawls downward over a roller 29 carried by the framework 20′ near its hinge 21′, and extending thence throughout the length of a shield or guard such as a tube 30, to and through the end E of the car, and attached to a suitable handle such as a lever 31 as best seen in Fig. 1. It is obvious that when this lever is moved to draw upon the trip rope 28, the tips of the pawls are depressed out of engagement with the rack bars 26 so that the standards no longer support the body of the support itself, and the latter can be lowered by proper manipulation of the windlasses. The descent of the support carries the standards down with it to the position indicated in dotted lines in Fig. 7. In Fig. 1, I have shown two such standards, although it is obvious that with a shorter car and a stronger supporting member, one standard might be sufficient, and for a longer car than shown it might be necessary to have even more than two.

Thus it will be seen that I have produced an attachment which may be built into the car at the time the latter is made or applied thereto after it has been put into use, and by means of which the stock within the car will be kept in erect position so that, if they are packed therein head to tail as shown in Fig. 2, a larger number of animals can be stored in the car than under other conditions, their safety is maintained, and even the weaker ones are kept standing without physical injury to them. The materials and proportions of parts need not be stated in this specification, and changes in the details of construction may be made without departing from the principle of the invention.

What is claimed as new is:

The combination with a car having longitudinal tubes upon its floor, and two windlasses each having its shaft journaled through the car end with a drum on its inner extremity and a hand wheel on its outer extremity; of a guard inclosing each drum, a cattle-supporting bar extending longitudinally throughout the length of the car, ropes leading from the bar upward to said drums, inwardly facing channeled guides carried by the bar, a rack bar carried by the bar between the guides, two standards each consisting of a framework hingedly connected at its lower end with the car floor and having a cross rod through its upper end, rollers thereon traveling in said guides, a pawl pivoted on said rod and having a weighted rear end throwing its tip normally upward into engagement with said rack bar, a roller mounted near the lower end of said frame, a trip rope having its inner end connected with said pawl and its body passing downward beneath said roller and thence throughout the length of one of said tubes, and a handle on its other end outside the car and adjacent the hand wheel of the windlass which controls that end of the supporting bar.

In testimony whereof I have hereunto set my hand in presence of two subscribing witnesses.

WILLIAM KAYLOR.

Witnesses:
 ADA SEAVER,
 HOMER BAUGHMAN.

---

Copies of this patent may be obtained for five cents each, by addressing the "Commissioner of Patents, Washington, D. C."